C. D. MILLER.
PRESSURE REGULATING AND SHUT-OFF VALVE COMBINED.
APPLICATION FILED JUNE 1, 1909.
935,217.
Patented Sept. 28, 1909.
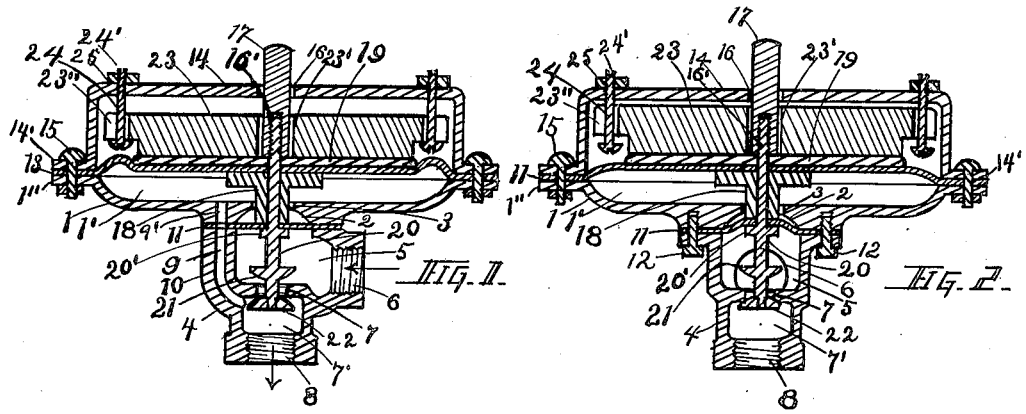
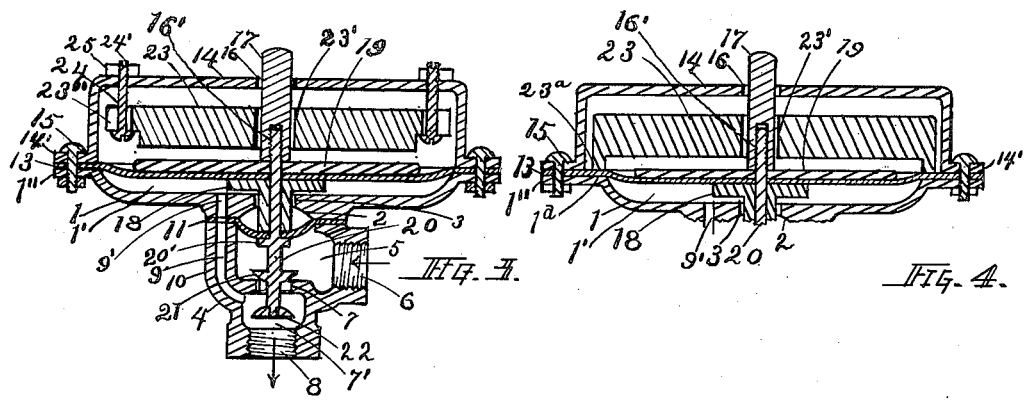
WITNESSES:
James M. Rogers.
John J. Hinton
INVENTOR.
Cosby D. Miller
BY
George W. Hinton
ATTORNEY.

UNITED STATES PATENT OFFICE.

COSBY D. MILLER, OF ST. JOSEPH, MISSOURI.

PRESSURE-REGULATING AND SHUT-OFF VALVE COMBINED.

935,217.     Specification of Letters Patent.    Patented Sept. 28, 1909.

Application filed June 1, 1909. Serial No. 499,556.

*To all whom it may concern:*

Be it known that I, COSBY D. MILLER, a citizen of the United States, residing at St. Joseph, in the county of Buchanan and State of Missouri, have invented certain new and useful Improvements in Pressure-Regulating and Shut-Off Valves Combined, of which the following is a specification, reference being had therein to the accompanying drawing.

My invention relates to improvements in pressure regulating valves and shut-off valves, and the objects of my improvements are, first; to combine on one valve stem, operated by one diaphragm, a pair of valves, one of which shall automatically act as an efficient pressure regulating valve, for closing a valve opening, and reduce a high, supply pressure of gas or liquid, to a constant predetermined service pressure, in its flow through said valve opening; while the other one of said valves automatically acts as an efficient shut-off valve, and shuts off said flow of gas or liquid, when the pressure of same is lowered to a certain predetermined low pressure, lower than said service pressure, and thereafter continues to shut off said flow, until said shut-off valve is manually opened; second; to so construct a pressure regulating and shut-off valve combined, that the moving parts thereof shall be operated by said pressure of gas and by gravity, without the use of springs, and the like; be positive and extremely sensitive in their action, be simple in construction, durable, not at all liable to get out of working order, be neat in appearance and extremely cheap in cost of manufacture. I attain these objects by the mechanism illustrated in the accompanying drawing, in which:—

Figure 1. is a longitudinal section, cut vertically through the center of all the parts, showing both valves open. Fig. 2. is a transverse section cut vertically through the center of the valves, showing the pressure regulating valve closed. Fig. 3. is a section, similar to Fig. 1, showing the shut-off valve closed. Fig. 4. is a section, similar to Fig. 3, showing one of the various forms in which the pressure regulating weight may be made and supported; certain parts being broken away.

Referring to Figs. 1 and 2, my invention comprises the diaphragm holder 1, having diaphragm chamber 1', formed therein, and is provided with annular flange 1'', formed on the outer edge thereof. Said diaphragm holder is also provided with concaved recess 2, formed in the central portion of its lower surface, and has aperture 3 and port opening 9' through the bottom thereof. Valve body 4, has valve chamber 5, formed therein, and the screw threaded inlet opening 6, leading into said valve chamber. Said valve body is also provided with valve opening 7, outlet chamber 7', and screw threaded outlet opening 8, leading from said valve chamber. In the wall 10, of valve body 4, is the port 9, which connects with aperture 9' and forms communication between outlet chamber 7' and diaphragm chamber 1'. Diaphragm holder 1 and valve body 4, have the outer edge portion of second diaphragm 11, placed between them, and are secured together by cap screws 12, seen in Fig. 2. Said diaphragm provides closing means for at all times closing aperture 3, in such manner as will allow stem guide 18 to be sensitive to every impulse, and move with perfect freedom in said aperture. Said second diaphragm also provides elastic packing for the contacting surfaces of said valve body and diaphragm holder, thereby rendering unnecessary, the machining of said surfaces, and thus cheapening the cost of manufacturing said parts. Covering diaphragm chamber 1', and with its edge resting on flange 1'', is diaphragm 13, on the edge of which rests the annular flange 14' of the diaphragm cover 14; said flanges being secured together by bolts and nuts 15. Said cover has aperture 16, formed therethrough, of ample size to admit bolt 17, and to permit free passage of air therethrough. The previously mentioned stem guide 18 has its lower portion guided in aperture 3 and its upper portion contacting the under surface of diaphragm 13, which together with shut-off weight 19, on the upper surface of said diaphragm, are secured together by having valve stem 20, provided with flange 20' formed thereon, passed upward through the centers of second diaphragm 11, stem guide 18 and shut-off weight 19, with flange 20' beneath said second diaphragm, and the upper screw threaded portion of said stem screwed into the lower end of bolt 17, which also thereby secures said valve stem, the central portion of diaphragm 11 and said stem guide together. Both of said diaphragms are formed of such flexible material as is adapted to withstand the action of the liquids and gases, which are to pass through said valve.

Secured on the lower end of valve stem 20, in outlet chamber 7', is the pressure regulating valve 22, adapted to contact the lower side of valve opening 7, and close said opening. In cover 14 is the pressure regulating weight 23, provided with central aperture 23', through which loosely passes the bolt 17. Said weight also has slots 23'', formed in the outer periphery thereof. Screws 24, provided with slots 24' in their upper ends are loosely passed upward, through slots 23''. screwed through cover 14, the heads of which act as adjustable supports for weight 23; which are adjusted by an ordinary screw driver, not shown inserted in slots 24', for turning said screws, until weight 23 is thereby brought to the position seen in Fig. 1., with valves 21 and 22, both in open position; after which said adjustment of screws 24 is secured by lock nuts 25, as seen.

It will be seen that the diameter of aperture 3 is greater than the diameter of the lower portion of stem guide 18, which moves therein, and that apertures 16 and 23', are of greater diameter than bolt 17, thereby providing loose guiding means, wherein said stem guide and said bolt, move upward and downward with perfect freedom; thus providing a pressure regulating valve and shut-off valve combined, of extreme sensitiveness, and which will be operated with certainty, by gas or liquid under any pressure, even though said pressure be extremely low. It will be further seen and understood, that should the alinement of valve opening 7, and valves 21 and 22 and their attached parts be imperfect, said valves, by reason of their semispherical form, will be laterally guided and moved by said opening when pressed against the same, to a perfect seat, closing said opening; and that said loose guiding means and second diaphragm 11, in no way retard said lateral movement of said valves.

In operation, with the parts in the position seen in Fig. 1.; gas, under high, supply pressure is admitted through inlet opening 6, into valve chamber 5, and flows therefrom, through valve opening 7, into outlet chamber 7', thence through outlet opening 8 into such service system, not shown, as may be connected therewith. As the pressure of said gas accumulates in chamber 7', said gas passes therefrom, through port 9 and aperture 9', into diaphragm chamber 1', beneath diaphragm 13, which supports shut-off weight 19, held down by pressure regulating weight 23, which is made of such amount as is required to be overcome and be lifted by a certain predetermined service pressure of said gas. When said gas has had its pressure raised beneath diaphragm 13 to said service pressure, said diaphragm is lifted thereby, and moves all the moving parts, including pressure regulating valve 22, from the position seen in Fig. 1., to the position seen in Fig. 2.; thus closing valve opening 7, which position of parts is maintained, until pressure of gas in outlet chamber 7' becomes lower than said service pressure, whereupon weight 23 gravitates and moves the parts to the position seen in Fig. 1., with weight 23 supported on the heads of screws 24; which latter position again admits high pressure of gas, as described, upon which the described operation is repeated, and so continues while gas is used through outlet 8. Thus providing an efficient pressure regulating valve, as stated in the objects.

It will be understood that shut-off weight 19 is made of the required amount to overcome any certain predetermined low pressure of gas, beneath diaphragm 13, and gravitate, as hereinafter described. Said low pressure, in the use of gas, would be such pressure, lower than said service pressure, as would render uncertain, the burning of gas, in any gas burner.

It will be seen and understood from the foregoing, that so long as any pressure of gas from said service pressure, down to said low pressure is maintained in chamber 1', beneath diaphragm 13, shut-off weight 19 is thereby held up against pressure regulating weight 23, with the parts in position seen in Fig. 1., and when from any cause, said pressure of gas goes below said low pressure, shut-off weight 19 gravitates and moves the parts attached thereto, including valve 21, to the position seen in Fig. 1. closing valve opening 7. It wil be further seen and understood, that upon the return of said high, supply pressure, or in fact any pressure of gas, in valve chamber 5, through inlet opening 6, shut-off valve 21 prevents any of said returned pressure of gas from entering outlet chamber 7', port 9 and chamber 1', and that shut-off weight, for this reason, holds valve 21 closed, in shut-off position, until weight 19 and its attached parts are manually raised by bolt 17 from the position seen in Fig. 3 to the position seen in Fig. 1.

The described automatic closing of shut-off valve 21, and the continued retention of same in said shut off position, prevents the casualties, incident to the return of pressure of gas to said service system, after said pressure has become dangerously lowered, or has ceased from any cause.

While I have shown and described my invention in the foregoing manner; it is evident that pressure regulating weight 23 could be made of various forms and be supported in a variety of ways, without departing from the spirit of my invention; one of such various forms of said weight and its supports being shown in Fig. 4, in which said weight is provided with annular flange 23ª, formed therewith, adapted to be supported upon that part of diaphragm 13, which is supported on the inward extension 1ª of flange 1″.

Having fully described my invention, what I claim as new and desire to secure by Letters Patent is:—

1. In a pressure regulating and shut-off valve combined, the combination of a valve body, provided with a valve chamber therein, an inlet opening leading into said valve chamber, a valve opening, an outlet chamber and an outlet opening leading from said valve chamber, a pressure regulating valve in said outlet chamber, adapted to be drawn against the lower side of said valve opening, for closing the same; a shut-off valve in said valve chamber, adapted to be pressed on the upper side of said valve opening, for closing the same, and a valve stem passing through said valve opening and having said valves secured thereon; said valve stem being provided with a flange formed thereon and with an upper screw threaded portion, a diaphragm holder, having a diaphragm chamber therein; a diaphragm cover for covering said diaphragm, said cover being provided with an aperture through the center thereof; a pressure regulating weight of predetermined amount in said cover, said weight being adapted to be moved upward and downward therein; supporting and guiding means adjustably secured in said cover, whereby said regulating weight is supported and guided; a shut-off weight of predetermined amount, on said diaphragm, under said regulating weight; a stem guide under said diaphragm, and securing means whereby said shut-off weight, said diaphragm and said stem guide are secured together, a second diaphragm, the outer edge of which is secured between said valve body and said diaphragm holder, and securing means, whereby said valve stem the central portion of said second diaphragm and said stem guide are secured together; and communicating means through the wall of said valve body and the bottom of said diaphragm holder, for communicatively connecting said outlet chamber with said diaphragm chamber.

2. A valve of the character described, comprising a valve body, having a valve chamber and an outlet chamber therein, and a valve opening communicating with both of said chambers, an inlet opening for said valve chamber and an outlet opening for said outlet chamber; a diaphragm holder, having a diaphragm chamber therein and an aperture through the center of the bottom thereof; a diaphragm, secured on said diaphragm holder; a shut-off weight on said diaphragm; a shut-off valve in said inlet chamber; a pressure regulating valve in said outlet chamber and connecting means through said valve opening, through said valve chamber, and through said aperture in said diaphragm holder, whereby said valves, said diaphragm and said shut-off weight are connected; a second diaphragm for closing said aperture in said diaphragm holder around said connecting means, the outer edge of said second diaphragm being between said valve body and said diaphragm holder and provided with securing means, whereby said valve body, said second diaphragm and said diaphragm holder are secured together, and securing means, whereby the central portion of said second diaphragm is secured to said connecting means, a pressure regulating weight, above, and adapted to be lifted by said shut-off weight and supporting and guiding means, whereby said regulating weight is supported and guided; communicating means, whereby said outlet chamber and said diaphragm chamber are communicatively connected, and lifting means, whereby said shut-off weight and its attached parts can be manually lifted.

In testimony whereof I affix my signature in the presence of two witnesses.

COSBY D. MILLER.

Witnesses:
JAMES M. ROGERS,
JOHN J. HINTON.